2,806,827

METHOD OF REACTING SUGAR CANE WAX WITH A CALCIUM COMPOUND AND COMPOSITIONS CONTAINING SAME

Edward A. Wilder, Racine, Wis., assignor to S. C. Johnson & Son, Inc., Racine, Wis.

No Drawing. Application August 4, 1954, Serial No. 447,937

3 Claims. (Cl. 260—28)

This invention relates to a method of treating deoiled sugar cane wax and to the products resulting from such treatment. More particularly, it relates to a method of substantially improving the characteristics of deoiled sugar cane wax in order to render the product more suitable for use in the carbon paper industry.

Crude sugar cane wax consists essentially of three components: a hard wax fraction, a resinous fraction, and an oily or soft fatty fraction. The deoiled wax is the crude sugar cane wax from which about 85% of the oily or soft fraction, consisting mainly of the glycerides of oleic and linoleic acid, has been removed. For practical purposes, the oily or soft fraction is that portion of the crude sugar cane wax soluble in acetone at 25° C., while, for the purpose of the present processing, the resinous fraction is the portion of the crude which is insoluble in boiling 99% isopropanol. Removal of the oily fraction leaves a composition referred to as whole hard wax which by modification may be rendered suitable for use as a coating component for carbon paper. The co-pending application, S. N. 353,013, filed May 4, 1953, now Patent No. 2,682,516, teaches that improvement of the whole hard wax for this use may be brought about by oxidation followed by the addition of certain resinous materials.

The various attempts which have been made to render sugar cane wax suitable for use in this field are directed at the improvement of three characteristics. First, it has been found that a wax, to be suitable as a constituent of a coating for carbon paper, should impart to the coating a firm physical structure called gel strength. A wax having this property is characterized as having good oil-retention, producing a coating composition which is not greasy, and identified by a number described as the oil-retention-penetration value.

The second property which is desirably found in a wax suitable for use in a carbon paper coating is its oil and dye bleed resistance. This property measures the ability of a carbon paper coating to retain the oil and the dyes during storage even under heat and pressure. This property is important, particularly when the carbon paper is used with business forms containing intermittent sheets of carbon and white paper, e. g., department store charge books. Poor oil and dye bleed resistance permits the migration of the oils and dyes from the carbon paper to stain the white paper.

The third important property of a good wax for this use is described as ball mill yield. Carbon paper coatings are conventionally made by mixing carbon black, wax and ink-oil in a ball mill. Certain waxes may make the mixture thixotropic, preventing easy flowing of the ink from the mill. Treatment of a wax to improve its oil-retention and oil and dye bleed resistance many times results in a product having poor ball mill yield.

A method for treating deoiled sugar cane wax has now been discovered which not only improves the oil-retention and the oil and dye bleed resistance, but yields a wax having excellent ball mill yield. The method comprises melting deoiled sugar cane wax and heating it to a temperature of from 80 to 150° C. while introducing a gas containing available oxygen until the acid value is within the range of 22 to 38. The air flow is stopped and the temperature adjusted to between 100 and 150° C. at which time 1 to 5%, by weight of the wax, of a metallic oxide or hydroxide is added. Suitable oxides are those of aluminum, magnesium, calcium, zinc, barium, and lithium. The elevated temperature is maintained until the wax imparts to a 25/75 wax-ink-oil mixture an oil-retention-penetration value of 140 or less.

In another embodiment of this invention, the deoiled sugar cane wax is oxidized as described above to an acid value of at least 22. The properties of the wax may be further improved by adding at this point from 2 to 20% by weight of a resin such as rosin-maleic addition products, rosin acids, rosin esters, and phenyl phenol formaldehyde resins. The blending or union of the resinous material with the oxidized sugar cane wax is most effectively accomplished by continuing the introduction of a gas containing available oxygen until the oil-retention-penetration value of the composition is about 150. This generally requires a continuation of the oxidation process for 2 or 3 hours.

As a result of this process, a new and improved sugar cane wax product has been discovered comprising a deoiled sugar cane wax and a small amount of an oxide or hydroxide of a metal such as aluminum, magnesium, calcium, zinc, barium and lithium. Another product discovered is a composition comprising the above materials plus a minor amount of a resin.

The oil-retention-penetration value is measured by using the apparatus designated in the American Society for Testing Materials, designated D-217-48. The test is as follows: 12½ grams of the sample of wax to be tested is melted with 37½ grams of ink-oil, which is a light viscosity (about SAE 10) petroleum oil, and heated to 100° C. This mixture is stirred to uniformity and poured into an aluminum foil dish approximately 2½″ in diameter and ½″ deep. After the mixture solidifies, it is conditioned at 25° C. for two hours or more. The oil-retention-penetration value is obtained by measuring the depth of penetration in 1/10 millimeters of a 9° needle, in five seconds, carrying a standard weight. It has been determined that waxes having an oil-retention-penetration value of less than about 140 measured on 75 ink-oil/25 wax mixture using a 50 gram weight are operable as the wax constituent of carbon paper coatings.

A test has been developed which satisfactorily demonstrates the ability of a wax to impart oil bleed resistance to a carbon paper coating. The test is as follows: The transverse center axis of a 5 x 1 inch strip of No. 1 filter paper is held against a 50/50 wax-ink-oil cake by a 1 inch steel cylinder ¾ inches in diameter. The central axis of the steel cylinder is parallel to the transverse axis of the filter paper. The strip of filter paper encircles the steel cylinder and is fastened by means of a paper clip or staple or some similar means immediately above the steel cylinder. The paper is held in contact with the wax-ink-oil cake for 18 hours at room temperature at which time the strip of paper is removed and the length of the stain is measured in inches. Ouricuri wax, widely used in the carbon paper industry, has a value of about 2 to 2½ inches, while carnauba wax has a value of about 3 inches, whereas the sugar cane wax treated according to the process of this invention gives a value of 1 inch or less. Dye bleed resistance is measured similarly except that a waxink-oil dye cake is used and the contact time of the paper with the cake is four hours at 40° C.

The method of measuring the ball mill yield of the wax is as follows: 105 grams of ink-oil, 13.8 grams of wax, and 19.4 grams of carbon black are mixed in a ball mill and stirred for one hour at approximately 130° C. and then the liquid is poured out and the yield is determined. If more than 10% of the dispersion remains in the ball mill, the yield is considered poor. Deoiled and deresinated sugar can wax usually has a poor ball mill yield of around 40 to 50%. This process gives a wax which has a ball mill yield of over 90% even if it has been deresinated.

The waxes which may be effectively treated by the process of this invention are either the deoiled sugar cane wax, called whole hard wax, or deoiled and deresinated sugar cane wax, called hard wax, or mixtures thereof. Oxidation is suitably carried out with a material containing available oxygen such as air, oxygen gas, nascent oxygen, ozone, mixtures thereof, or synthetic mixtures of these gases with an inert material such as nitrogen, carbon dioxide, etc. It is realized that nascent oxygen and ozone are not commercially available as such, but it has been found the mixtures of these gases with oxygen not only increase the rate of reaction but yield a product with improved oil-retention.

The wax should be oxidized to an acid number of at least 22 before adding the resin and oxide or hydroxide. Otherwise further oxidation of the wax will be inhibited, preventing the achievement of a product having optimum oil-retention-penetration value. Oxidation of the wax to an acid number greater than 38 would cause darkening and degradation of the wax molecules to lower molecular weight components forming an objectionably softer wax. Degradation of the wax may also occur if the introduction of the gas is continued after the addition of the oxide or hydroxide. It is therefore important that the desired degree of oxidation be completed before such an agent is added.

The rate at which oxygen is supplied is not critical. However, when air is used as the oxidizing gas, the preferred rate is approximately 10 cubic feet of air per pound of wax per hour. It should be appreciated that this optimum rate of flow may vary somewhat, depending upon several factors, as for example, the size and shape of the vessel, type of agitation employed, and the amount of time allowed the reaction.

Of the resins suitably added singly or in combination to the oxidized wax composition, the rosin-maleic addition products may be the adducts of rosin and maleic acid, maleic anhydride, or fumaric acid. The rosin acids which may be employed are abietic, l-pimaric, neoabietic, and d-pimaric. Typical rosin esters are those prepared from the foregoing acids and glycerol, ethylene glycol, or pentaerythritol. Any of the phenyl phenol formaldehyde resins may be employed. However, the p-phenyl phenol formaldehyde resin is preferred. The amount of the resin to be added to the wax can range between 2 to 20% by weight of the wax. Amounts less than 2% do not materially improve the characteristics of the modified sugar cane wax, while amounts greater than 20% of the resin produce a product having diminished wax-like characteristics and unsuitable for use in carbon paper coatings.

The temperature of the reaction may range from 80 to 150° C. until the addition of the oxide or hydroxide, at which time the reaction must be maintained at a temperature of at least 100° C. Temperatures above 150° C. cause excessive darkening and degradation of the wax molecules. If temperatures below the minimum as set forth above are employed, the reaction proceeds at a negligible rate.

Following oxidation, the wax is treated with from 1 to 5% by weight of an oxide or hydroxide selected from the group of metals consisting of aluminum, magnesium, calcium, zinc, barium, and lithium. The following table shows the variation of the penetration of a 75 oil/25 wax gel, measured as previously described, when a sugar cane wax is treated with various percentages of calcium oxide:

| Percent CaO by weight | Oil-retention-penetration value |
|---|---|
| 0 | 170 |
| 1 | 140 |
| 2 | 104 |
| 3 | 102 |
| 8 | 105 |

It is readily apparent that less than 1% calcium oxide would give a wax product which would not perform satisfactorily in a wax-ink-oil since a value of 140 or less must be obtained to be suitable. Above 5% some of the calcium oxide sludges out of the reaction and shows no further product improvement. The hydroxide of calcium gives equivalent results as will the oxides or hydroxides of aluminum, magnesium, zinc, barium or lithium.

Now, having indicated the nature and scope of the invention, the following examples will serve as further illustration. It is to be understood, however, that such examples are presented merely as illustrations of the invention and are not to be construed as limiting the same.

*Example I*

980 grams of whole hard sugar cane wax which had the following characteristics was melted in a suitable reaction vessel:

1. Oil-retention-penetration value _____ 170
2. Ink-oil bleed _____ inches __ 2½
3. Acid value _____ 19
4. Ball mill yield _____ percent __ 92

The wax was heated to 115° C. and air was introduced into the molten wax through the bottom of the vessel by means of a gas dispersion tube at a rate of approximately 20 cubic feet per hour. Simultaneously, with the entrance of air into the vessel, mechanical agitation was conducted immediately above the air entrance. The reaction was continued until the wax attained an acid number of 30 at which time the air flow was stopped and the temperature of the wax was raised to 135° C. and 20 parts by weight of calcium hydroxide was added. The agitation was continued and the temperature maintained at 135° C. for 5 hours at which time the wax was cooled and had the following characteristics:

1. Oil-retention-penetration value _____ 90
2. Ink-oil bleed _____ inches __ ½
3. Acid value _____ 21
4. Ball mill yield _____ percent __ 90

*Example II*

980 grams of a hard sugar cane wax which had the following characteristics:

1. Oil-retention-penetration value _____ 107
2. Ink-oil bleed _____ inches __ 2½
3. Acid value _____ 9
4. Ball mill yield _____ percent __ 45 was treated exactly as in Example I and after treatment had the following characteristics:

1. Oil-retention-penetration value _____ 107
2. Ink-oil bleed _____ inches __ ⅞
3. Acid value _____ 20
4. Ball mill yield _____ percent __ 90

*Example III*

475 grams of hard and 475 grams of whole hard sugar cane wax were oxidized in exactly the same manner as in Example I to an acid value of 30 at which time the temperature was raised to 135° C., 50 grams of p-phenyl phenol formaldehyde resin was added and air was introduced for approximately 2 more hours. At this time the acid value was 33. The introduction of air was then stopped and 20 grams of calcium oxide was added and allowed to react with the wax for a period of 5 hours. The wax was cooled and had the following characteristics:

1. Oil-retention-penetration value_____ 125
2. Ink-oil bleed_____inches__ ¾
3. Acid value_____ 22
4. Ball mill yield_____percent__ 93

*Example IV*

475 grams of deoiled and deresinated and 475 grams of deoiled but non-deresinated sugar cane wax were oxidized and treated exactly as in Example III except that 50 grams CaO was added instead of 20.

The final product had the following characteristics:

1. Oil-retention-penetration value_____ 104
2. Ink-oil bleed_____inches__ ½
3. Acid value_____ 20
4. Ball mill yield_____percent__ 91

*Example V*

475 grams of hard and 475 grams of whole hard sugar cane wax were oxidized and treated exactly as in Example III except that 10 grams of calcium oxide was added instead of 20. The wax product had the following characteristics:

1. Oil-retention-penetration value_____ 140
2. Ink-oil bleed_____inches__ ⅞
3. Acid value_____ 22
4. Ball mill yield_____percent__ 92

*Example VI*

475 parts of deoiled and deresinated and 475 of deoiled but non-deresinated sugar cane wax were oxidized and treated exactly as in Example I except that 15 grams of lithium oxide was substituted for the 20 grams of CaO. The product had the following characteristics:

1. Oil-retention-penetration value_____ 135
2. Ink-oil bleed_____inches__ 1
3. Acid value_____ 19
4. Ball mill yield_____percent__ 92

Thus, from the foregoing examples, it can readily be appreciated that the modified waxes prepared by this process are vastly improved and useful as the wax constituent of carbon paper coatings. It will be noted that deoiled as well as deoiled-deresinated and mixtures thereof can be successfully modified by this process to yield improved waxes.

While the disclosure cites only a limited number of embodiments of the process and product of the invention herein presented, it is possible to produce still other embodiments without departing from the inventive concept herein disclosed, and it is desired therefore that only such limitations be imposed on the appended claims as are stated therein, or required by the prior art.

I claim:

1. A method of modifying a sugar cane wax of the group consisting of deoiled wax, deoiled-deresinated wax and mixtures thereof, comprising melting said wax and introducing a gas containing available oxygen until the molten wax attains an acid number within the range of 22 to 38, admixing from 1 to about 5% of a reactant of the group consisting of calcium oxide and calcium hydroxide, adjusting the temperature of said wax to the approximate range of 80° to 150° C. during the introduction of said gas and said reactant, and continuing to maintain such temperatures until the oil-retention-penetration value of the composition is no greater than 140.

2. A method of modifying a sugar cane wax of the group consisting of deoiled wax, deoiled-deresinated wax and mixtures thereof, comprising melting said wax and, at a temperature within the approximate range of 80° to 150° C., introducing a gas containing available oxygen until the molten wax attains an acid number within the range of 22 to 38, admixing at such temperature 2 to about 20% by weight of phenyl-phenol formaldehyde resins continuing the introduction of said gas until oil-retention-penetration value of the composition is about 150, adding 1 to about 5% by weight of a reactant of the group consisting of calcium oxide and calcium hydroxide and maintaining said temperature to reduce said oil-retention-penetration value to no more than 140.

3. An improved sugar cane wax consisting essentially of from about 75 to 97% by weight of a sugar cane wax of the group consisting of deoiled wax, deoiled deresinated wax and mixtures thereof oxidized to an acid member of between 22 and 38 and further modified by the addition of from 2 to about 20% by weight of phenyl-phenol formaldehyde resins, and from 1 to about 5% by weight of a member of the group consisting of calcium oxide and calcium hydroxide said modified wax having an oil-retention-penetration value of less than 140.

References Cited in the file of this patent

UNITED STATES PATENTS

| | | |
|---|---|---|
| 2,674,608 | Dupont et al. | Apr. 6, 1954 |
| 2,682,516 | Wilder et al. | June 29, 1954 |
| 2,683,092 | Whyte et al. | July 6, 1954 |

OTHER REFERENCES

Warth's, "The Chemistry and Technology of Waxes," New York, 1947, page 136.